United States Patent
Im et al.

(10) Patent No.: US 8,688,885 B2
(45) Date of Patent: Apr. 1, 2014

(54) HARDWARE ACCELERATION APPARATUS, METHOD AND COMPUTER-READABLE MEDIUM EFFICIENTLY PROCESSING MULTI-CORE SYNCHRONIZATION

(75) Inventors: Chae Seok Im, Suwon-si (KR); Shi Hwa Lee, Seoul (KR); Seung Won Lee, Hwaseong-si (KR); Jae Don Lee, Paju-si (KR); Min Kyu Jeong, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 404 days.

(21) Appl. No.: 12/904,782

(22) Filed: Oct. 14, 2010

(65) Prior Publication Data

US 2011/0252258 A1    Oct. 13, 2011

(30) Foreign Application Priority Data

Apr. 13, 2010    (KR) .................. 10-2010-0033813

(51) Int. Cl.
- *G06F 13/40* (2006.01)
- *G06F 12/14* (2006.01)
- *G06F 9/46* (2006.01)

(52) U.S. Cl.
USPC .......................... 710/307; 710/200; 718/102

(58) Field of Classification Search
USPC ................... 710/307, 200; 718/102
See application file for complete search history.

(56) References Cited

U.S. PATENT DOCUMENTS

| | | | | |
|---|---|---|---|---|
| 8,055,855 B2 * | 11/2011 | Sarkar et al. | ................. | 711/150 |
| 8,099,731 B2 * | 1/2012 | Li et al. | ......................... | 718/104 |
| 2005/0258106 A1 * | 11/2005 | Cape | ............................. | 210/739 |
| 2005/0268106 A1 * | 12/2005 | Mansell et al. | ............... | 713/182 |
| 2006/0224805 A1 * | 10/2006 | Pruscino et al. | ............. | 710/200 |
| 2008/0235701 A1 * | 9/2008 | Danko | .......................... | 718/104 |
| 2008/0288691 A1 * | 11/2008 | Bie et al. | ........................ | 710/200 |
| 2010/0031265 A1 * | 2/2010 | Koning et al. | ................ | 718/104 |
| 2010/0262966 A1 * | 10/2010 | Dow et al. | ..................... | 718/102 |
| 2011/0161540 A1 * | 6/2011 | Chang et al. | .................. | 710/200 |
| 2011/0239219 A1 * | 9/2011 | Fulton et al. | .................. | 718/103 |

FOREIGN PATENT DOCUMENTS

| | | |
|---|---|---|
| JP | 2009-75948 | 4/2009 |
| JP | 2009-217721 | 9/2009 |
| KR | 1997-0056902 | 7/1997 |
| KR | 2002-0091057 | 12/2002 |
| KR | 10-0496116 | 6/2005 |
| KR | 10-2007-0037427 | 4/2007 |
| KR | 10-2007-0083772 | 8/2007 |
| KR | 10-2008-004792 | 5/2008 |

OTHER PUBLICATIONS

Arm, Application Note 216, Oct. 2008, ARM Limited.*

* cited by examiner

*Primary Examiner* — Paul R Myers
*Assistant Examiner* — Christopher a Daley
(74) *Attorney, Agent, or Firm* — Staas & Halsey LLP

(57) ABSTRACT

Provided is a hardware acceleration apparatus, method and computer-readable medium efficiently processing multi-core synchronization. A processor core that fails to acquire a lock variable may be switched to a low power sleep mode and a waste of power may be reduced. Additionally, when a lock variable is returned, a wakeup signal may be transmitted to a processor core operated in the low power sleep mode, and the processor core may be activated.

14 Claims, 4 Drawing Sheets

HARDWARE ACCELERATION APPARATUS, METHOD AND COMPUTER-READABLE MEDIUM EFFICIENTLY PROCESSING MULTI-CORE SYNCHRONIZATION

CROSS-REFERENCE TO RELATED APPLICATIONS

This application claims the benefit of Korean Patent Application No. 10-2010-0033813, filed on Apr. 13, 2010, in the Korean Intellectual Property Office, the disclosure of which is incorporated herein by reference.

BACKGROUND

1. Field

Example embodiments of the following description relate to a hardware acceleration apparatus, method and computer-readable medium efficiently processing multi-core synchronization and that may store a lock variable in a shared memory, instead of repeatedly performing a spinning operation to acquire the lock variable, to improve a performance of a system with a minimum cost.

2. Description of the Related Art

Multi-core technologies enable integration of multiple processor cores in a single chip, to achieve high performance while using low power. A multi-core chip may be used in a large number of electronic devices.

When each algorithm constituting an application program is divided among multiple cores, a multi-core synchronization is used to synchronize the cores or to transmit or receive data.

To scalably increase performance of a multi-core system, it is most important to efficiently perform multi-core synchronization.

A spinlock is the most basic function of the multi-core synchronization.

A lock variable is stored in a shared memory to control an access to a shared resource, and only a core that acquires a lock using a spin_lock( ) function may exclusively use a corresponding resource.

A core that fails to acquire the lock waits for a backoff delay and repeatedly attempts to acquire the lock until the lock is acquired.

A core possessing the lock may return a lock variable through a spin_unlock( ) function.

In a spinlock scheme, the backoff delay may be estimated using software in order to improve performance.

Various schemes of estimating delay are provided, for example a simple scheme of using a constant delay, or a complicated scheme of appropriately adjusting the delay based on a history. Generally, an exponential backoff scheme (Delay'=Delay*2) is known to be the most efficient scheme.

SUMMARY

The foregoing and/or other aspects are achieved by providing a hardware acceleration apparatus including a first processor core that fails to acquire a lock variable and does not have an exclusive access right to a shared resource, a second processor core that succeeds to acquire the lock variable and has the exclusive access right to the shared resource, and a shared memory to store the shared resource, the first processor core and the second processor core attempting to access the shared resource, wherein the first processor core is operated in a low power sleep mode until the lock variable is acquired.

The foregoing and/or other aspects are achieved by providing a hardware acceleration method including maintaining a first processor core set that fails to acquire a lock variable and does not have an exclusive access right to a shared resource, maintaining a second processor core set that succeeds to acquire the lock variable and has the exclusive access right to the shared resource, storing the shared resource, the first processor core set and the second processor core set attempting to access the shared resource, and generating a predetermined wakeup signal and activating a predetermined processor core of the first processor core set operated in a low power sleep mode using the generated wakeup signal, when the lock variable is returned from the second processor core set.

According to another aspect of one or more embodiments, there is provided at least one computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
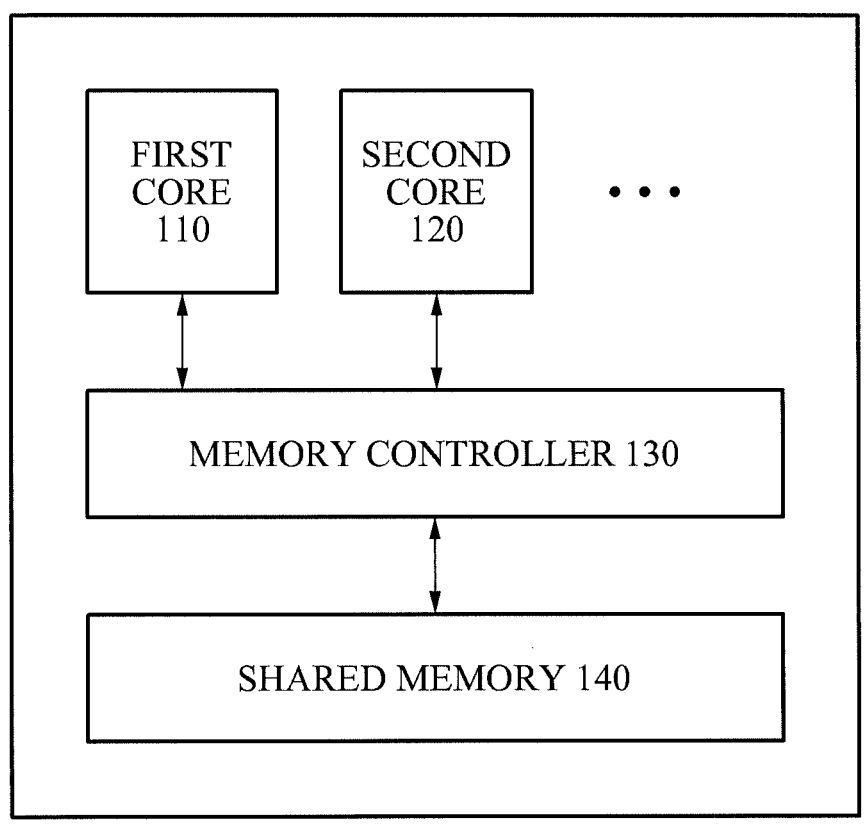
FIG. 1 illustrates a block diagram of a hardware acceleration apparatus according to example embodiments.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates a hardware acceleration apparatus 100 according to example embodiments.

The hardware acceleration apparatus 100 of FIG. 1 may include a first processor core 110, a second processor core 120, a memory controller 130, and a shared memory 140.

The first core 110 and the second core 120 may constitute a multi-core, and may have an exclusive access right to a shared resource when a lock variable is acquired.

For example, the first core 110 may be a core that fails to acquire the lock variable and does not have the exclusive access right to the shared resource, and the second core 120 may be a core that succeeds in acquiring the lock variable and has the exclusive access right to the shared resource.

The memory controller 130 may generate a predetermined wakeup signal when the lock variable is returned from the second core 120.

When the wakeup signal is received, the first core 110 may be switched to an active state, and may request the memory controller 130 to transmit the returned lock variable.

Additionally, when the first core 110 is switched to the active state and acquires the requested lock variable, the second core 120 may return the exclusive access right to the first core 110.

The memory controller 130 may activate the first core 110 operated in a low power sleep mode, using the generated wakeup signal.

Specifically, the first core 110 may compete with the second core 120 for the lock variable in order to preoccupy the exclusive access right to the shared resource.

As a result of the competition, the second core 120 may have the exclusive access right to the shared resource by acquiring the lock variable. The first core 110 may wait a predetermined time before reattempting to acquire the lock variable, because of its failure to acquire the lock variable.

When the first core 110 fails to acquire the lock variable, the main controller 130 may control the first core 110 to be operated in the low power sleep mode.

In the low power sleep mode, the first core 110 may be maintained in an "ON" state using only minimum power, and may not parse the memory controller 130 to acquire a lock variable for a predetermined period.

When the exclusive access right to the shared resource is not required, the second core 120 may return the lock variable to the memory controller 130.

When the lock variable is received, the memory controller 130 may generate a wakeup signal to switch the first core 110 from the low power sleep mode to a general active mode.

Additionally, the memory controller 130 may transmit the generated wakeup signal to the first core 110, to assign the lock variable to the first core 110.

In response to the wakeup signal, the first core 110 may be switched from the low power sleep mode to the active mode.

The first core 110 switched to the active mode may request the memory controller 130 to transmit the lock variable, to preoccupy the exclusive access right to the shared resource.

When the requested lock variable is acquired, the first core 110 may preoccupy the exclusive access right to the shared resource, and cores other than the first core 110 may lose the exclusive access right.

The shared memory 140 may store actual information regarding the lock variable, and the shared resource together with the lock variable.

The memory controller 130 may store an address where the lock variable is stored in the shared memory 140, rather than directly storing the lock variable.

Specifically, the shared memory 140 may store the returned lock variable in a location corresponding to a predetermined address. The memory controller 130 may store lock state information and address information on the predetermined address. Here, the lock state information may be used to display whether at least one of the first core 110 and the second core 120 acquires the lock variable, and the address information may correspond to the lock state information.

Figure 2:
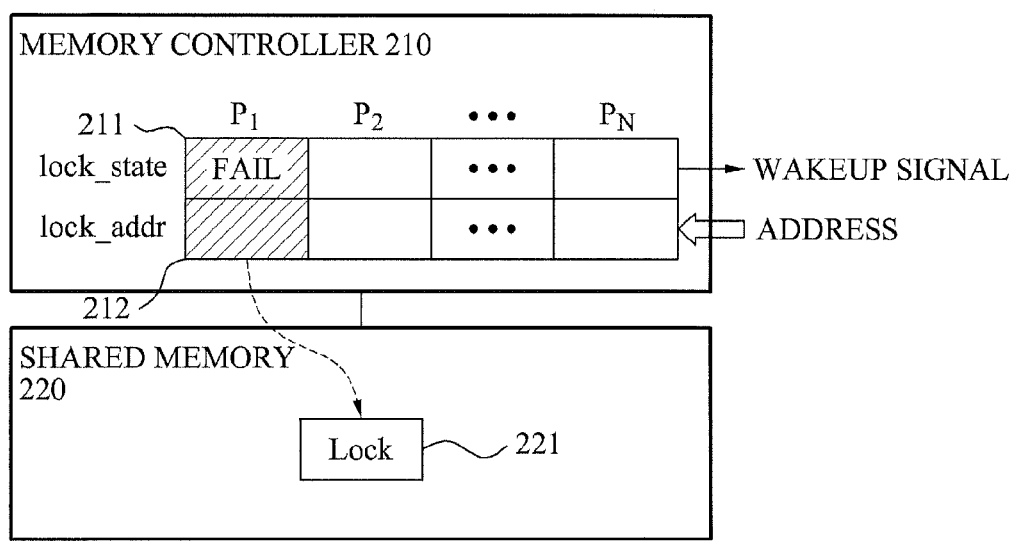
FIG. 2 illustrates a diagram of a memory controller and a shared memory according to example embodiments.

FIG. 2 illustrates a memory controller 210 and a shared memory 220 according to example embodiments.

Referring to FIG. 2, the memory controller 210 may maintain lock state information "lock_state" and address information "lock_addr" in a table form for each core.

A predetermined portion 211 may store lock state information indicating whether the lock variable is acquired.

Specifically, the lock state information stored in the predetermined portion 211 may be used to notify whether the lock variable is acquired, using "Fail" or "Success."

Another predetermined portion 212 may store a memory address where a corresponding core attempts to acquire a lock variable, based on the lock state information stored in the predetermined portion 211.

Specifically, the other predetermined portion 212 may store information on an address for a predetermined location 221 in the shared memory 220 where a lock variable desired by a corresponding core is stored.

A first core activated in response to a wakeup signal may acquire the lock variable from the shared memory 220, based on the other predetermined portion 212 in the memory controller 210.

When the lock variable is acquired, the first core may acquire the exclusive access right to the shared resource.

The memory controller 210 may verify the exclusive access right of at least one of the first core and a second core based on the lock state information, and may update the lock state information.

Figure 3:
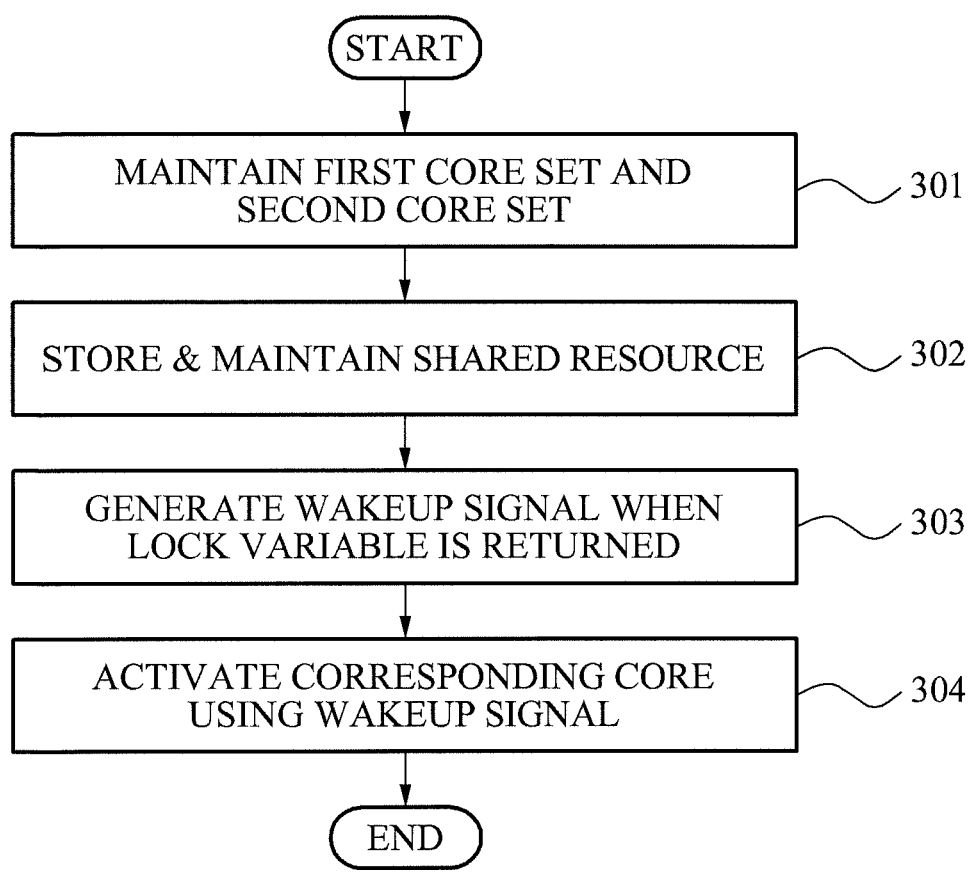
FIG. 3 illustrates a flowchart of a hardware acceleration method according to example embodiments.

FIG. 3 illustrates a hardware acceleration method according to example embodiments.

Referring to FIG. 3, a first core set and a second core set may be maintained in operation 301.

Here, the first core set may fail to acquire a lock variable and may not have an exclusive access right to a shared resource. The second core set may succeed in acquiring the lock variable and may have the exclusive access right.

The shared resource that the first core set and the second core set attempt to access may be stored and maintained in operation 302.

When the lock variable is returned from the second core set, a predetermined wakeup signal may be generated in operation 303.

The generated wakeup signal may enable a predetermined core of the first core set to be activated in operation 304. Here, the first core set may be operated in a low power sleep mode.

To activate the predetermined core, a priority for cores contained in the second core set may be verified.

Specifically, when the priority for cores contained in the second core set is verified, the wakeup signal may be transmitted to the predetermined core having a highest priority based on the verified priority, and the predetermined core may be activated.

As another example, to activate the predetermined core, the wakeup signal may be transmitted to all of the cores contained in the second core set, and the cores may be activated.

The second core set may be switched to the low power sleep mode, rather than repeatedly performing a spin operation. Here, the spin operation may be performed to acquire a lock variable.

Additionally, the second core set in the low power sleep mode may be activated to compete with the first core set for the lock variable. According to example embodiments, all cores currently in the low power sleep mode may be activated, rather than only activating a predetermined core.

For example, when a first core in the first core set fails to acquire the lock variable, a memory controller may set lock state information of the first core to be "FAIL."

Subsequently, a second core of the second core set or the second core set may be switched to the low power sleep mode. Specifically, when the lock variable is returned, the first core may generate a wakeup signal and transmit the generated wakeup signal to the second core or the second core set. In response to the wakeup signal, the second core or the second core set may be switched from the low power sleep mode to the active mode.

According to example embodiments, when lock state information of a plurality of cores is set to be "FAIL," or when the plurality of cores are switched to the low power sleep mode, the wakeup signal may only be transmitted to a core having a highest priority among the cores based on a priority for the cores.

According to example embodiments, when lock state information of a plurality of cores is set to be "FAIL," the wakeup signal may be transmitted to all of the plurality of cores.

When all of the plurality of cores are simultaneously woken up in response to the wakeup signal, a corresponding core may compete with other cores to acquire a lock variable.

According to example embodiments, the wakeup signal may be transmitted to all cores that exist in a current system, without checking cores operated in the low power sleep mode.

Here, cores that are operated in modes other than the low power sleep mode may ignore the wakeup signal.

Figure 4:
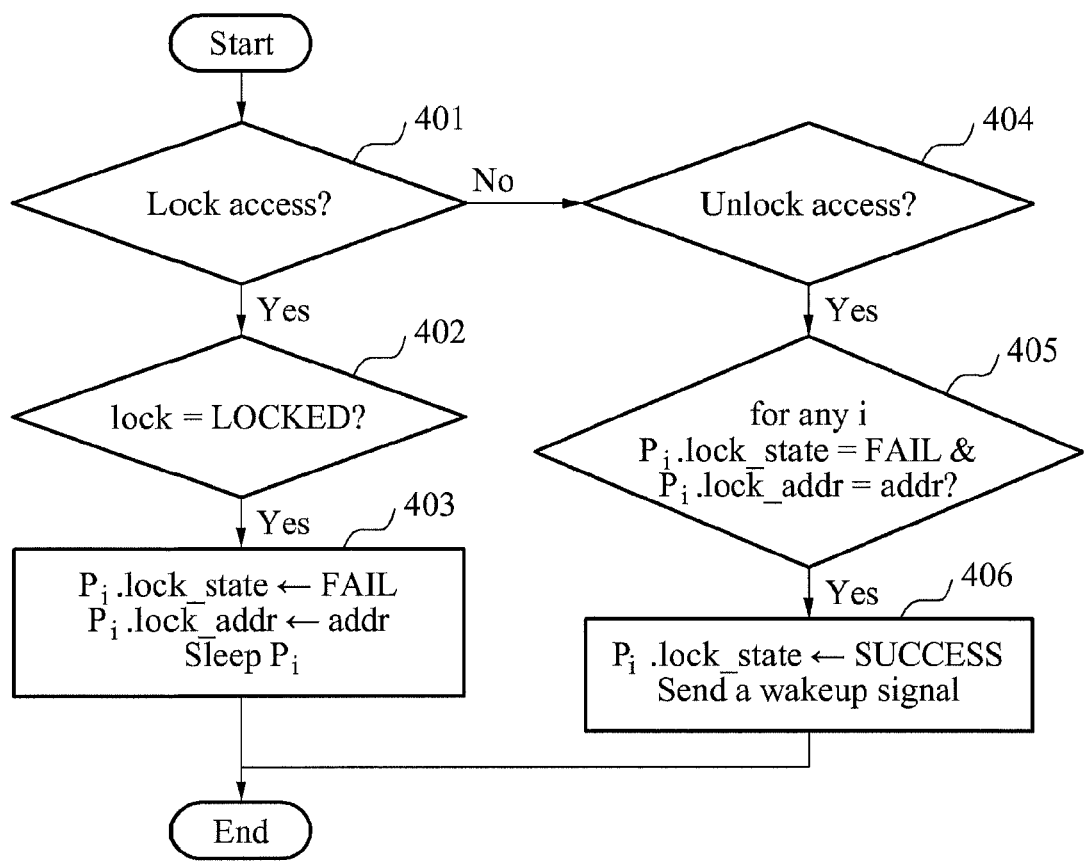
FIG. 4 illustrates a flowchart of a hardware acceleration method according to example embodiments, in further detail.

FIG. 4 illustrates a hardware acceleration method according to example embodiments, in further detail.

The hardware acceleration method according to example embodiments may be performed when a core attempts to access a shared memory.

Referring to FIG. 4, it may be determined whether the access to the shared memory is an access to a lock variable in operation 401.

When the access is determined to be the access to the lock variable, it may be determined whether the lock variable is currently being used by another core in operation 402.

Specifically, in operation 402, it may be determined whether the lock variable is "LOCKED".

When the lock variable is determined to be used by the other core, lock state information of the core that attempts to access to the lock variable may be set to be "FAIL" in operation 403. Here, the lock state information may be stored in a memory controller.

Additionally, when the lock variable is determined to be used by the other core, an address where the lock variable is stored may be stored in the memory controller.

The core that fails to access the lock variable may be switched to a low power sleep mode.

When the access is determined not to be the access to the lock variable as a result of the determining in operation 402, it may be determined whether the access to the lock variable is "Unlocked" in operation 404.

When the access to the lock variable is determined to be "Unlocked," it may be determined whether lock state information is set to be "FAIL" and the lock variable is stored in a current address for each core in operation 405.

When the lock variable is determined to be stored in the current address, the lock state information of a corresponding core may be set to be "SUCCESS," and a wakeup signal may be transmitted in operation 406.

The above-described embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

As described above, according to the example embodiments, it is possible to improve an efficiency of a system with a minimum cost.

Additionally, according to the example embodiments, it is possible to maintain an efficiency of a system even when a number of cores is increased.

Furthermore, according to the example embodiments, it is possible to reduce a system load occurring when a core spins to acquire a lock variable.

Moreover, according to the example embodiments, it is possible to reduce a memory utility and energy consumption.

Although a few embodiments have been shown and described, it should be appreciated by those skilled in the art that changes may be made in these embodiments without departing from the principles and spirit of the disclosure, the scope of which is defined in the claims and their equivalents.

What is claimed is:

1. A hardware acceleration apparatus, comprising:
a first processor core that fails to acquire a lock variable and does not have an exclusive access right to a shared resource;
a second processor core that succeeds to acquire the lock variable and has the exclusive access right to the shared resource;
a memory controller to manage the lock variable, to generate a wakeup signal when the lock variable is returned from the second processor core, and to activate the first processor core operated in a low power sleep mode using the wakeup signal; and
a shared memory to store the lock variable and the shared resource, the first processor core and the second processor core attempting to access the shared resource,
wherein the first processor core is operated in the low power sleep mode until the lock variable is acquired.

2. The hardware acceleration apparatus of claim 1, wherein the first processor core is switched from the low power sleep mode to an active mode and requests the memory controller to transmit the returned lock variable, when the wakeup signal is received.

3. The hardware acceleration apparatus of claim 2, wherein the second processor core returns the exclusive access right to the first processor core when the first processor core is switched to the active mode and acquires the requested lock variable.

4. The hardware acceleration apparatus of claim 1, wherein the shared memory stores the returned lock variable in a location corresponding to a predetermined address, and
the memory controller stores lock state information and address information on the predetermined address, the lock state information being used to display whether at least one of the first processor core and the second processor core acquires the lock variable, and the address information corresponding to the lock state information.

5. The hardware acceleration apparatus of claim 4, wherein the memory controller verifies the exclusive access right of at least one of the first processor core and the second processor core, and updates the lock state information.

6. The hardware acceleration apparatus of claim 1, wherein the wakeup signal is transmitted to processor cores contained in a processor core set, and the processor cores are activated.

7. The hardware acceleration apparatus of claim 1, wherein the wakeup signal is ignored by cores that are operated in modes other than in the low power sleep mode.

8. A hardware acceleration method, comprising:
  maintaining a first processor core set, the first processor core set failing to acquire a lock variable and not having an exclusive access right to a shared resource;
  maintaining a second processor core set, the second processor core set succeeding to acquire the lock variable and having the exclusive access right to the shared resource;
  storing the lock variable and the shared resource, the first processor core set and the second processor core set attempting to access the shared resource; and
  managing the lock variable and generating, by a memory controller, a wakeup signal when the lock variable is returned from the second processor core, and activating a predetermined processor core of the first processor core set using the generated wakeup signal, when the lock variable is returned from the second processor core set, the first processor core set operated in a low power sleep mode.

9. The hardware acceleration method of claim 8, wherein the activating comprises:
  verifying a priority for processor cores contained in the second processor core set; and
  transmitting the wakeup signal to the predetermined processor core, and activating the predetermined processor core, the predetermined processor core having a highest priority.

10. The hardware acceleration method of claim 8, wherein the activating comprises transmitting the wakeup signal to processor cores contained in the second processor core set, and activating the predetermined processor core.

11. At least one computer readable medium comprising computer readable instructions that control at least one processor to implement a method, comprising:
  maintaining a first processor core set, the first processor core set failing to acquire a lock variable and not having an exclusive access right to a shared resource;
  maintaining a second processor core set, the second processor core set succeeding to acquire the lock variable and having the exclusive access right to the shared resource;
  storing the lock variable and the shared resource, the first processor core set and the second processor core set attempting to access the shared resource; and
  managing the lock variable and generating, by a memory controller, a wakeup signal when the lock variable is returned from the second processor core, and activating a predetermined processor core of the first processor core set using the generated wakeup signal, when the lock variable is returned from the second processor core set, the first processor core set operated in a low power sleep mode.

12. The at least one computer readable medium comprising computer readable instructions that control at least one processor to implement the method of claim 11, wherein the activating comprises:
  verifying a priority for processor cores contained in the second processor core set; and
  transmitting the wakeup signal to the predetermined processor core, and activating the predetermined processor core, the predetermined processor core having a highest priority.

13. The at least one computer readable medium comprising computer readable instructions that control at least one processor to implement the method of claim 11, wherein the activating comprises transmitting the wakeup signal to processor cores contained in the second processor core set, and activating the predetermined core.

14. A hardware acceleration method using a memory controller, the method comprising:
  controlling, by the memory controller, a first processor core to be operated in a low power sleep mode when the first processor core fails to acquire a lock variable;
  receiving the lock variable from a second processor core;
  generating a wakeup signal, when the lock variable is received, to switch the first processor core from the low power sleep mode to a general active mode;
  transmitting the generated wakeup signal to the first processor core; and
  assigning the lock variable to the first processor core to grant the first processor core an exclusive access right to a shared resource.

* * * * *